(12) United States Patent
Ovalle et al.

(10) Patent No.: US 11,466,469 B2
(45) Date of Patent: Oct. 11, 2022

(54) TEMPORARY POOL COVER AND FLOOR SYSTEM

(71) Applicant: Colhurst Concepts, LLC, Dallas, TX (US)

(72) Inventors: Italia Marisol Ovalle, Duncanville, TX (US); Luis Fernando Ramirez, Duncanville, TX (US); Sherwood Noël Wagner, Dallas, TX (US)

(73) Assignee: Colhurst Concepts, LLC, Dallas, TX (US)

( * ) Notice: Subject to any disclaimer, the term of this patent is extended or adjusted under 35 U.S.C. 154(b) by 0 days.

(21) Appl. No.: 17/219,227

(22) Filed: Mar. 31, 2021

(65) Prior Publication Data

US 2021/0348411 A1    Nov. 11, 2021

Related U.S. Application Data

(62) Division of application No. 16/866,662, filed on May 5, 2020, now Pat. No. 11,028,606.

(51) Int. Cl.
*E04H 4/00* (2006.01)
*E04H 4/08* (2006.01)
*E04B 1/26* (2006.01)

(52) U.S. Cl.
CPC ........... *E04H 4/086* (2013.01); *E04B 1/2612* (2013.01)

(58) Field of Classification Search
CPC .............................. E04B 1/2612; E04H 4/086
USPC ........................................................ 52/702
See application file for complete search history.

(56) References Cited

U.S. PATENT DOCUMENTS

| | | | | |
|---|---|---|---|---|
| 625,427 A | * | 5/1899 | Stewart, Jr. et al. | . F16B 7/0446 403/190 |
| 796,433 A | * | 8/1905 | Kahn | .................... F16B 7/0446 403/190 |
| 804,451 A | * | 11/1905 | Carlson | ..................... F16B 9/05 52/702 |
| 922,215 A | * | 5/1909 | Tuteur | .................. F16B 7/0446 403/190 |
| 2,970,320 A | | 2/1961 | Karp | |
| 3,091,777 A | | 6/1963 | Pearlson | |

(Continued)

FOREIGN PATENT DOCUMENTS

| | | |
|---|---|---|
| CN | 209704111 U | 11/2019 |
| FR | 2924461 A1 | 6/2009 |
| FR | 3008441 A1 | 1/2015 |

OTHER PUBLICATIONS

Standard Profile / Premium Profile, website for product, screenshot taken Feb. 13, 2020, Technics & Applications, https://www.t-and-a.be/en/products/aquatop/slats.

(Continued)

*Primary Examiner* — Brian E Glessner
*Assistant Examiner* — James J Buckle, Jr.
(74) *Attorney, Agent, or Firm* — Hitchcock Evert, LLP

(57) ABSTRACT

The innovation relates to a pool covering system that is usable as a flooring surface. The pool covering system includes brackets that support beams spanning the pool opening. The beams provide structural support to cross members and flooring placed on top of the beams. The pool covering system does not require significant drainage of the pool and does not damage the pool structure during installation and use.

8 Claims, 13 Drawing Sheets

(56) References Cited

U.S. PATENT DOCUMENTS

| | | | | |
|---|---|---|---|---|
| 3,537,221 | A | * | 11/1970 | Helfman ................. F16B 9/058 52/289 |
| 3,752,512 | A | * | 8/1973 | Gilb ...................... E04B 1/2608 403/190 |
| 3,945,741 | A | * | 3/1976 | Wendt .................. E04B 1/5818 403/231 |
| 4,330,971 | A | * | 5/1982 | Auberger ............. E06B 1/6092 52/210 |
| 4,856,252 | A | * | 8/1989 | Cornell ................ E04B 1/2612 52/702 |
| 5,104,252 | A | * | 4/1992 | Colonias ................ F16B 9/058 403/232.1 |
| 5,271,483 | A | | 12/1993 | Hong |
| 5,303,527 | A | | 4/1994 | Perez et al. |
| 5,555,694 | A | * | 9/1996 | Commins ............. E04B 1/2612 52/702 |
| 5,564,248 | A | * | 10/1996 | Callies .................... F16B 9/058 52/702 |
| 6,463,711 | B1 | * | 10/2002 | Callies ................. E04B 1/2612 52/702 |
| 8,122,525 | B2 | | 2/2012 | Getz |
| 9,422,737 | B2 | | 8/2016 | Black et al. |
| 10,024,049 | B2 | * | 7/2018 | Brekke ................ E04B 1/2612 |
| 10,167,647 | B1 | | 1/2019 | Pierre |
| 2002/0078656 | A1 | * | 6/2002 | Leek ..................... E04B 1/2612 52/702 |
| 2004/0129845 | A1 | * | 7/2004 | Whale .................. E04B 1/2612 248/201 |
| 2006/0081743 | A1 | * | 4/2006 | Evans .................... E04C 3/125 248/226.11 |
| 2007/0199141 | A1 | | 8/2007 | Johnston |
| 2007/0294979 | A1 | * | 12/2007 | Lin ....................... E04B 1/2612 52/702 |
| 2008/0172976 | A1 | * | 7/2008 | Carney ................. E04B 1/2612 52/702 |
| 2008/0202060 | A1 | * | 8/2008 | Pilpel ................... E04B 1/2612 52/702 |
| 2009/0013458 | A1 | | 1/2009 | Getz |
| 2013/0067850 | A1 | * | 3/2013 | Sasanecki ............ E04B 1/2612 52/702 |
| 2015/0167291 | A1 | * | 6/2015 | Bundy .................. E04B 1/2612 52/702 |
| 2018/0135296 | A1 | * | 5/2018 | Brekke ................ E04B 1/2612 |
| 2018/0171620 | A1 | * | 6/2018 | Allen ...................... E04B 1/215 |
| 2019/0376275 | A1 | * | 12/2019 | Evans ....................... E04B 5/14 |

OTHER PUBLICATIONS

Architectural Cast Stone Roof Coping / Pool Coping, online product catalog, screenshot taken Feb. 24, 2020, Utica Cast Stone Company, Inc., http://www.uticacast.com/UTICA%20CAST%20STONE%20CATALOG_files/Page735.htm.

Mobile Deck: The 3-in-1 Platform, article about product, Apr. 20, 2018, screenshot taken Feb. 7, 2020, Euro Spa Pool News International Media of Pool and Spa Industry, https://www.eurospapoolnews.com/actualites_piscines_spas-en/58649-mobile,deck,pools,modularity,platform.htm.

Pool Coping and Fountains, digital brochure, 2017, screenshot taken Feb. 24, 2020, D.C. Kerckhoff Company, https://kerckhoffstone.com/brochures/.

Clear Acrylic Surface, website for product, screenshot taken May 14, 2020, In Depth Events, https://indepth.events/swimming-pool-covers/clear-acrylic.

Flush Mount Surface, website for product, screenshot taken May 14, 2020, In Depth Events, https://indepth.events/swimming-pool-covers/flush-mount.

212 Pool Cover Components, website for product, screenshot captured Jul. 9, 2020, Walk on Water LLC, walkonwaterentertainment.com/purchase 212.htm.

Youtube video at https://www.youtube.com/watch?v=ZwDyCdBOYpQ, "Putting a floor on my swimming pool" posted on Nov. 27, 2014. (Year: 2014).

* cited by examiner

TEMPORARY POOL COVER AND FLOOR SYSTEM

CROSS-REFERENCE TO RELATED APPLICATION

This application is a divisional application of U.S. application Ser. No. 16/866,662 filed on May 5, 2020, which is incorporated herein by reference.

FIELD OF THE DISCLOSURE

The invention relates generally to pool covers.

BACKGROUND

Pools are a common feature in residences, hotels and other venues. However, they often take up a large amount of space. When the area is being used for activities or entertaining that do not involve swimming or pool use, planning must account for the space that the pool occupies. For some situations, the lost space from the pool may make a location or venue unsuitable for hosting an event. In addition, pools and openings may need to be covered during construction and at other times in order to prevent people, tools and debris from entering the pool.

To make a venue usable, some people may empty the pool so that a floor may be constructed on scaffolding or other supports from the bottom of the pool. This requires significant time and equipment for draining and building a supported floor. This significant time is then repeated to remove the floor and refill the pool. In addition, the scaffolding and other supports may cause damage to the pool's bottom surface or even the liner.

Some venues may invest in and maintain a permanent floor structure that may roll out on top of the pool area as an alternative to having a floor built on scaffolding. This permanent retractable floor requires significant space to house the floor adjacent to the pool and equipment to move the flooring surface. If there is no advance planning for the flooring, permanent retractable flooring may not be an option without significant remodeling to accommodate the flooring feature. In addition, these flooring surfaces are often at a higher level than the surrounding areas, requiring people to step up and down to get onto and off of the flooring surface.

Finally, U.S. Pat. No. 10,167,647 teaches a "Modular Structure for Extension Over a Pool." This structure uses a series of sections that can be attached to extend over a pool. These sections include longitudinal members and transverse members that form a frame that sits on top of the surface surrounding the pool and extends over the pool. A tile or slat is placed on top of the frame to form a surface. Like the retractable flooring, the modular cover's surface is at a higher level than the surrounding area, requiring people to step up and down to get onto and off of the surface.

SUMMARY

The present disclosure provides a pool covering system that also acts as a floor. The pool covering system may be assembled across a pool without damaging the structure of the pool or requiring any embedded mounting features. The pool covering system may also support a floor surface that is flush or substantially flush with the surrounding structure of the pool. The pool covering system provides a temporary cover and floor that does not require adjacent space to store the surface when not in use as a cover.

The covering system may be used for many purposes, such as a flooring surface for entertaining, a safety cover when the pool is not in use to prevent people from falling in or for other purposes. For example, the pool covering system may be used to winterize a pool during the offseason to keep debris out and may provide a layer of insulation. As another example, the pool covering system may be used as a safety cover to prevent children or others from falling in a pool when it is not in use.

The pool covering system may be installed and removed efficiently and much faster than scaffolding systems. The pool covering system can be installed without emptying the pool. In some embodiments, the pool may be partially drained for installation to an amount sufficient to be below the bottom of the pool covering system. In most embodiments, the pool may be drained 18 inches or less to accommodate the pool covering system. In some embodiments, the pool may not be drained at all.

Embodiments of the pool covering system may include a series of brackets that hang from an edge of the pool structure into the pool opening. The brackets have a vertical strut extending from a hanger lip down from the pool structure's edge. A horizontal support extends from the vertical strut away from the pool wall toward an opposite side of the pool.

Embodiments of the brackets may have a first and second side frames spaced a sufficient distance to allow a beam to slide between the side frames. In some embodiments, the side frames are angled from the front of the horizontal support upward to the vertical strut near or to the hanger lip to form a triangle or similar shape. In some embodiments, the side frames are solid throughout the shape. The side frames in other embodiments are bars or rods that leave all or part of the shape open. In yet other embodiments, the side frames may have areas removed, such as a plurality of holes through an otherwise solid shape.

In some embodiments, the brackets are made of a rigid metal, such as a steel, iron or other metal. Some embodiments of brackets may be made from other materials with sufficient rigidity and strength to support the assembled flooring structure and people and items placed thereon. The brackets may be coated in another material to provide padding, waterproofing or other features.

In some embodiments, brackets are designed to fit over specific types of pool coping, such as square coping, bullnose coping, rolled coping, slim line coping or other coping types. For example, the bracket may include a longer hanger lip for a bullnose coping. As another example, the bracket may include an angled hanger lip with an extra support as well as a flexible material to engage slim line or rolled coping.

In some embodiments, the bracket may be angled to allow the beam to cross the pool at an angled orientation. In other embodiments, the side frame, horizontal support and vertical strut may be rotatable relative to the hanger lip. For example, the vertical strut may be connected to a rod that is rotatably connected to the hanger lip.

Embodiments of the pool covering system may also contain beams or joists that extend between two brackets on opposing sides of a pool. In some embodiments, the beams are placed between the side frames and rest against the horizontal supports of each of the two brackets. In this orientation, the beams may be vertically taller than they are wide (referring to the width aligned between the side frames on a bracket).

In some embodiments, static beams having a set length are used between opposite brackets. In other embodiments, the beam may be extendable to accommodate a range of lengths. An extendable beam may include one or more extendable portions. In one embodiment, the beam includes a central frame with two adjustable ends having supports that extend within the central frame. In another embodiment, the beam may include two frame sections that include the two ends connected by a supporting core.

Expandable beams may include locking features to maintain the correct size in some embodiments. Measuring features may be included on the beams to allow a user to adjust the beam length to a desired length using pre-marked measurements. Some embodiments include covers or spacers to fill in the height of the beam across expansion areas.

In some embodiments, cross members are placed on top of the beams. The orientation of the cross members may be substantially perpendicular to the beams to create a grid pattern over the pool surface. Embodiments of the beams may include recesses designed to fit cross members and form a substantially flat top surface between the beams and cross members.

The cross members and beams may be attached to each other using connectors, such as screws, bolts, pegs, clips, fittings or other connecting components.

Embodiments of the pool covering system may include a set of subfloor panels that are placed over the cross members. A floor surface may then be placed over the subfloor to create the final floor. In some embodiments, subfloor panels may not be used and the flooring may be placed on the cross members.

In some embodiments, the brackets may include light or sound features. For example, the brackets may include a switch to turn on a light when the beam is installed. In some embodiments, the bracket may include a pair of switches on opposite sides of the side frames. Each switch may be connected to a light (such as an LED), speaker or other output. When a beam is installed, the switches may be triggered to cause an output indicating a correctly installed beam.

In some embodiments, the switches may cause a different output to indicate an incorrectly installed beam. The beam may be designed to correspond to the switches to confirm correct placement. For example, the beam may include a divot or indention corresponding to the switch. When a beam is correctly placed, the switches are depressed then expand back into the indention. If the switches do not align with the indention, they will not re-expand the same, which indicates an incorrect alignment.

In some embodiments, the beams or cross members may include light, sound or other features. These features may be powered or controlled by internal power sources, control processors and wireless communications. In other embodiments, the power or control may be facilitated through a connection with the bracket. For example, the bracket may include a raised nodule on the horizontal support configured to fit into a corresponding indention of the beam to form an electrical connection. The nodule and indention may include a sealing ring or cover configured to form a waterproof seal when the beam is properly connected to the bracket.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
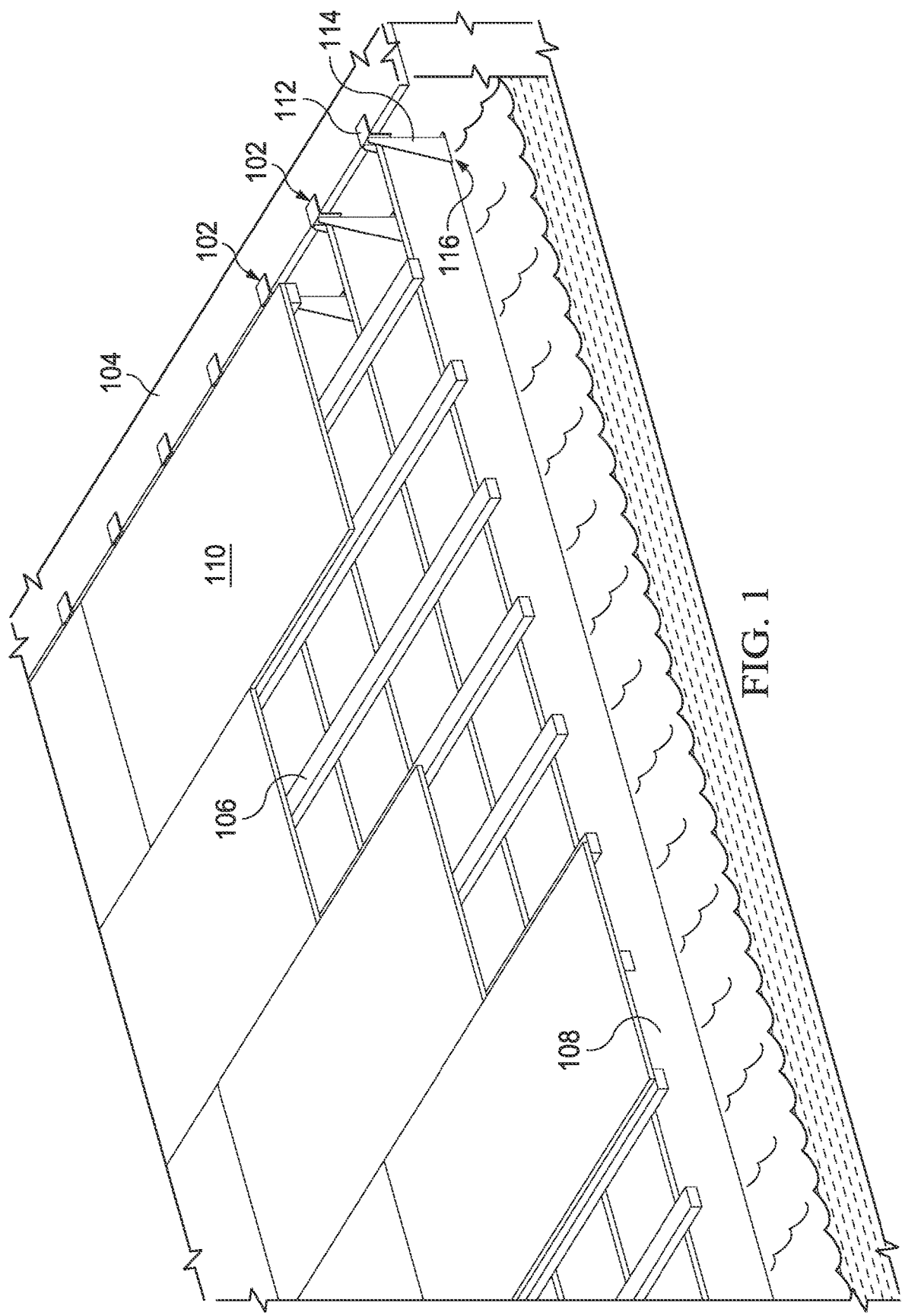
FIG. 1 is a perspective view of a partial installation of a pool covering system.

FIG. 1 shows a partial implementation of the pool covering system. The pool covering system includes brackets 102 that hang from the pool structure 104 and hold beams 108 across the pool. The beams 108 are shown in this embodiment above the water and below the surface of the pool structure 104. The beams 108 support cross members 106 that are spaced apart on top of the beams 108. Floor panels 110 are on top of the cross members 106. The floor panels 110 may be subflooring support panels, such as plywood, or the final flooring surface, such as a dance floor surface or a Plexiglas® panel.

The pool covering system is able to cover many sizes and shapes of pools using multiple separate brackets 102 and beams 108 to frame a sturdy cover. The brackets 102 shown on one side of FIG. 1 correspond with brackets 102 on the opposite side to form the support for a beam 108. The brackets 102 are shown in FIG. 1 with a hanger lip 112, a side frame 114 and a horizontal support 116. The hanger lip 112 extends over a top surface of the pool structure 104. The side frames 114 align the beams 108 in a vertical position in this embodiment over the horizontal support 116. The hanger lip 112 and horizontal support 116 provide structural support for beams 108 that are hung from the pool structure 104.

Multiple beams 108 may be spaced along the pool using pairs of the corresponding brackets 102. Multiple cross members 106 may then be spaced over the top of each beam 108 to form a grid pattern. The spacing of beams 108 and cross members 106 may vary to accommodate the pool size and support requirements for the floor. In addition, the bracket 102, beam 108 and cross member 106 sizes and materials may vary for different installations based on the pool size, aesthetics and support requirements. The size, shape and material of the floor panel 110 may also vary based on the pool size, aesthetics and support requirements.

As an example, a pool covering system for a small pool may use brackets 102 configured to hold two-by-six boards, as the beams 108, in a vertical orientation—that is, the six inch side extends vertically and the two inch side extends horizontally. The length of the board will extend across the pool between brackets 102. These beams 108 may be placed every 18 inches to form a strong base. Cross members 106 may be one-by-four boards placed substantially perpendicular to the length of the beams 108 and spaced every two feet. The cross members 106 may be placed horizontally—that is, the one inch side extending vertically and the four inch side extending horizontally. Those skilled in construction will recognize that board sizes may vary from their specified size. For example, a two-by-four piece of lumber may actually be 1.5" by 3.5". Finally, floor panels 110 may be a wood dance floor.

As another example, the pool covering system for a large pool may use brackets 102 configured to hold two-by-twelve inch beams 108, in a vertical orientation. These beams 108 may be placed every 21 inches to form a strong base. Two-by-four inch cross members 106 may be placed substantially perpendicular to the length of the beams 108 and spaced every 30 inches. The cross members 106 may be placed horizontally. Floor panels 110 may be a subflooring plywood placed over the cross members 106. A floor surface may then be placed over the floor panels 110.

In some embodiments, the components may be attached to each other using a connector, such as a screw, bolt, peg, clamp, nail, adhesive, fitted joint or other connector. Attaching components may create a stronger floor and result in less movement in some cases. For example, connecting the cross members 106 to the beams 108 will reduce the ability of any one beam 108 to flex or shift independent of the other beams 108 and cross members 106. In addition, connecting the floor panels 110 to the cross members 106 will reduce noise created by any gaps or flexing in the floor panels 110 relative to the cross members 106. In some embodiments, a liner or gaskets may be included on or between the brackets 102, cross members 106, beams 108 or floor panels 110 to reduce noise and movement of the components.

The components may be made from a variety of materials or combinations to provide structural support. In addition, supporting materials may be selected for their aesthetics in certain applications.

Those having ordinary skill in the art will recognize that the brackets 102 may be built from any material providing sufficient strength and rigidity to hold the flooring structure in place using the hanger lip 112 and horizontal support 116. For example, the brackets 102 may be made from metals, polycarbonates, polyethylene (HDPE or LDPE) plastic, PVC (polyvinyl chloride) or other combinations, such as plastics with integrated metals. In some embodiments, the materials may comprise a structural material, such as a metal, and a coating that surrounds the structural material, such as a rubber, polyurethane or nylon coating. The coating may be designed to provide a layer of padding, to waterproof the bracket 102, to provide an aesthetic finish or to provide another benefit. The materials may be corrosion proof or resistant or coated in sealants or materials to provide a corrosion resistant protection. For example, a metal bracket 102 may be coated with a rust resistant sealant.

Beams 108 may be any material providing sufficient strength and rigidity to hold the flooring structure above it. For example, beams 108 may be created from wood, metal, Plexiglas®, plastics, polycarbonates, plastic Lumber fortified with fiberglass, polyethylene (HDPE or LDPE) plastic, PVC (polyvinyl chloride) or combinations of materials. The materials may be corrosion proof or resistant or coated in sealants or materials to provide a corrosion resistant protection.

Similarly, cross members 106 may be any material providing sufficient strength and rigidity to transfer support from the beams 108 to the floor panels 110. For example, cross members 106 may be created from wood, metal, Plexiglas®, plastics, polycarbonates, plastic Lumber fortified with fiberglass, polyethylene (HDPE or LDPE) plastic, PVC (polyvinyl chloride) or combinations of materials. Floor panels 110 may also be any material providing sufficient strength and rigidity for the intended purpose of the floor, including wood, metal, Plexiglas®, plastics, polycarbonates, plastic Lumber fortified with fiberglass, polyethylene (HDPE or LDPE) plastic, PVC (polyvinyl chloride) or combinations of materials. The materials may be corrosion proof or resistant or coated in sealants or materials to provide a corrosion resistant protection.

Figure 2A:
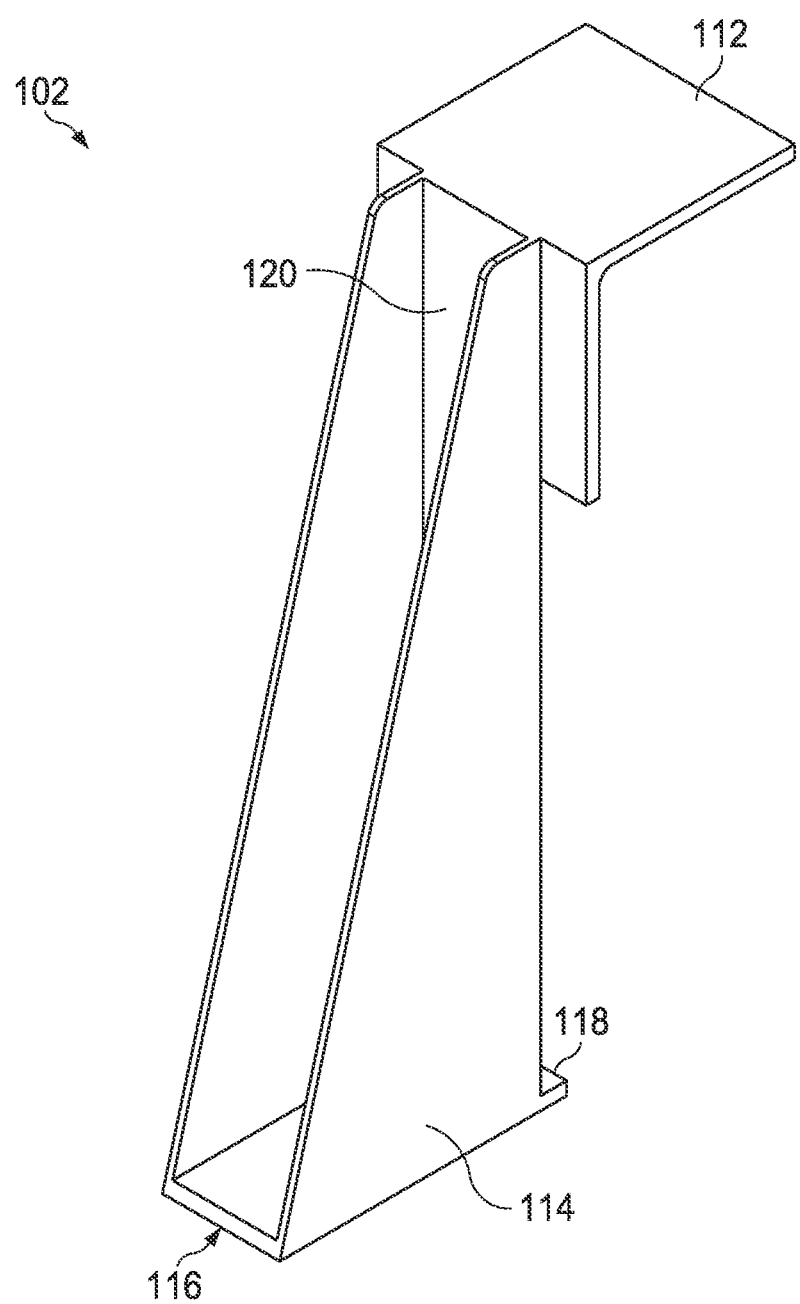
FIG. 2A is a perspective view of an embodiment of a bracket.
Figure 2B:
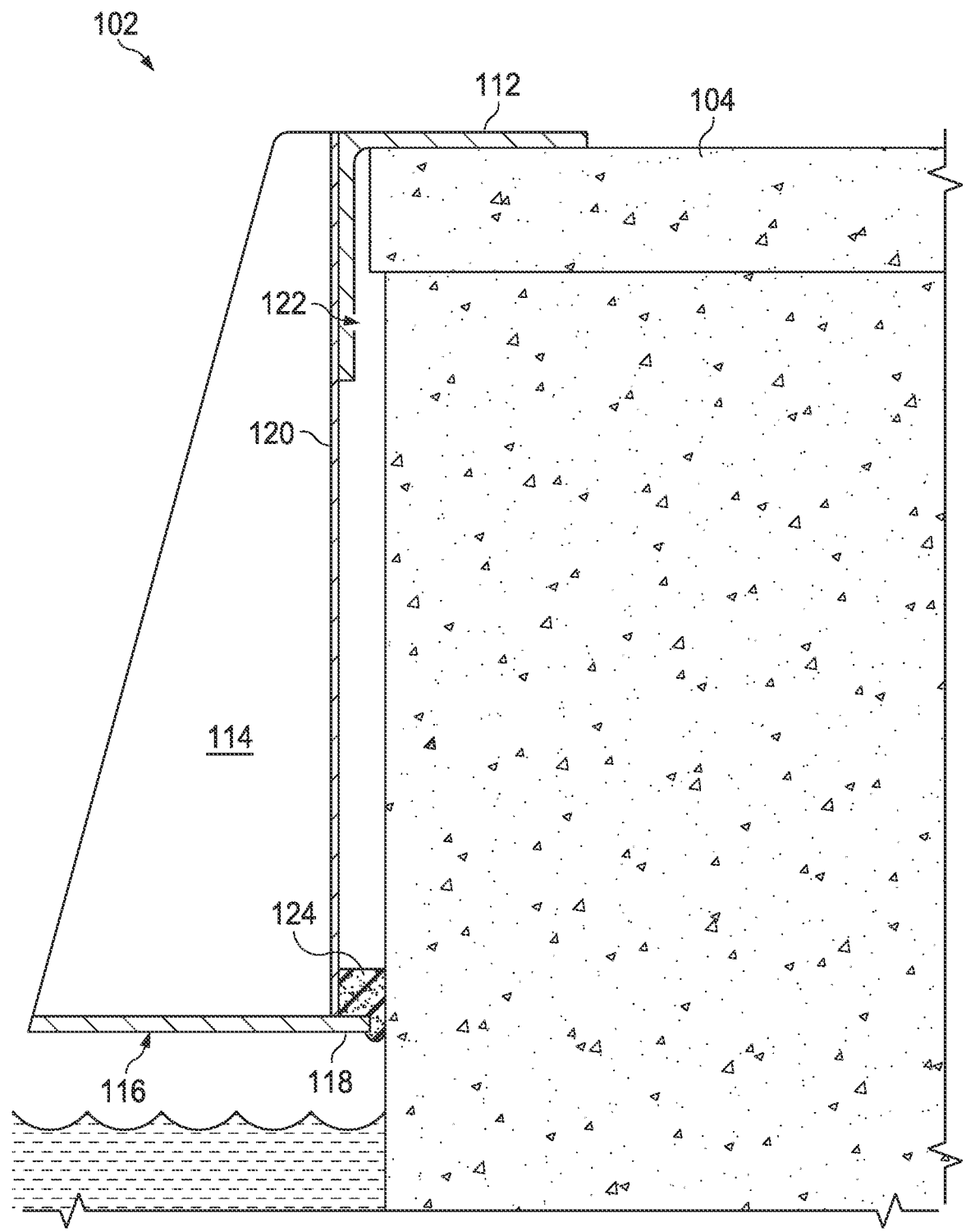
FIG. 2B is a side view of an embodiment of a bracket hanging from an edge of a pool structure.

FIG. 2A shows an embodiment of a bracket 102. The bracket 102 includes the hanger lip 112, side frame 114, horizontal support 116, foot 118 and vertical strut 120. FIG. 2B provides a side view showing the bracket 102 in place on a pool structure 104. This embodiment includes a pad 124 on the foot 118. The pad 124 may be any soft, malleable or protective material, such as rubber, plastic, nylon or other materials.

The hanger lip 112 of the bracket 102 extends over the coping 122 of the pool structure 104 to hang from the top surface of pool structure 104 into the opening of the pool structure 104. When the bracket 102 hangs from the pool structure 104, a gap may be created between the back of the vertical strut 120 and the side surface of the pool structure 104.

In this embodiment, the pad 124 on foot 118 contacts the side surface of the pool structure 104 below the coping 122. The pad 124 protects the side of the pool structure 104 and maintains the gap between the vertical strut 120 and side surface of the pool structure 104. In some embodiments, the pad 124 may be coated onto the foot 118. Some embodiments may hang from the top of a pool structure 104 without the foot 118 or pad 124 contacting the side surface of the pool structure 104.

In this embodiment, the water line is shown below the horizontal support 116. During installation, this may require the pool to be drained a minimal amount to lower the water level below the bracket 102's bottom surface. For example, the water level may be drained one foot to accommodate the flooring structure. This substantially reduces the amount of water removed, which is better for the environment, and reduces the amount of time needed to remove the water to install other systems, such as scaffolding.

In some embodiments, the brackets 102 and beams 108 may be partially submerged in the pool water instead of draining the pool at all. The components may be made of waterproof materials or coated with a waterproof material to allow their submersion.

The pool covering system attaches to the pool structure 104 without requiring any bolts, screws or other connectors to the pool structure 104. The pool covering system is supported by the plurality of hanger lips 112 on brackets 102 that are spread around the pool structure 104. Some embodiments of the pool covering system may not require any tools for installation. In other embodiments, tools, such as mallets, hammers or screwdrivers, may be used to attach beams 108, cross members 106 and floor panels 110 to each other. Some embodiments may also connect the beams 108 to the brackets 102.

The pool covering system may be installed quickly by a small team of people reducing the time and cost necessary for covering a pool using prior methods as well as protecting the pool from damage in the process. In addition, time and planning is more efficient because the pool does not need to be drained fully for installation.

Prior to installation, the installer or facility owner may gather pool dimensions and feature information to select appropriate components for the installation. For example, the owner may provide a pool blueprint with dimensions and coping information. Based on this information, the installer may select brackets 102 that fit the coping and properly-sized beams 108. The beams 108 may be custom built, solid beams or adjustable beams that can fit each span. Some pools will require a variety of different size beams 108 and brackets 102. The components may be numbered or colored or use other coding to indicate where components should be placed. An installation guide showing the coded pattern may also be provided for installation. Once the materials are selected and delivered, the installation process may begin.

When the installation process begins, a user may begin the draining process using a pump or any other conventional means while he begins laying out the components from storage or a delivery. For embodiments of the pool covering system having waterproof or water resistant components, the draining step may be skipped or the components may be placed during the drainage process. During this set-up stage, the user may adjust the length of any expandable beams to correspond to the appropriate span length for installation.

For the installations that include draining, the drainage process may be stopped when the water level is below the horizontal support of the brackets 102. This level may vary depending on the needed bracket size. For example, if an eight inch bracket is used, the pool may be drained eight inches or less depending on the starting water level relative to the pool edge. As another example, a larger pool may use a 16 inch bracket and be drained 16 inches or less.

For some installations, two or more people place corresponding brackets 102 across the pool from each other and then place the beam 108 into the brackets 102 vertically. The people continue to work their way along the pool placing brackets 102 and beams 108. The beams 108 are placed substantially parallel in most installations, though certain pools may use beams at varied angles to deal with curves or turns in a pool. For systems that include installation warnings or output features, the installers may ensure no incorrect installation warnings and that any necessary features are properly connected and attached.

Once the brackets 102 and beams 108 are in place, the installers may begin placing the cross members 106. In some embodiments, this process includes laying the cross members 106 over a series of beams 108 and attaching the cross members 106 to the beams 108. This may include using connectors to attach components. In some embodiments, the cross members 106 are placed into notches in the beams 108 to create a flat or nearly flat top surface. In some embodiments, the cross members 106 are staggered so that any spaces between cross members 106 are not aligned across the pool.

Once the cross members 106 are in place, one or more flooring panels 110 may be placed over the cross members 106. In some embodiments, a liner or pad may be placed between the flooring panels 110 and the cross members 106. The liner may be used to absorb movement, noise or both.

In other embodiments, a subfloor may be placed before a final flooring layer is placed on top. A liner may be part of the subfloor or separately placed before or after the subfloor.

In some embodiments, the flooring layer or the subflooring layer may be attached to the cross members or beams using connectors, such as nails, screws, pegs clips, friction connectors or other connectors.

When it is time for the flooring cover to be removed, the process is reversed. Connectors and the corresponding flooring layers, cross members 106 and beams 108 are removed in order. In some embodiments, the components may be directly placed in a storage container or structure that organizes the components to simplify future installations. For example, specialized storage containers may include labeled cubbies or shelves into which each flooring panel 110, subflooring panel, cross member 106 and beam 108 is placed by its location for the installation. For example, the first beam 108 may be placed in cubby one, the second in cubby two, etc. The brackets 102 may also have specified storage locations in the container. Once the pool covering system is properly stored, the storage container may be moved to a remote or on-site location until next use.

In some embodiments, the brackets 102 may include a hinged or slidable horizontal support, hanger lip 112 or other feature designed to reduce storage space while still providing sufficient structural integrity during installation. In addition, the brackets 102 may be designed to stack together in order to reduce space.

Figure 3:
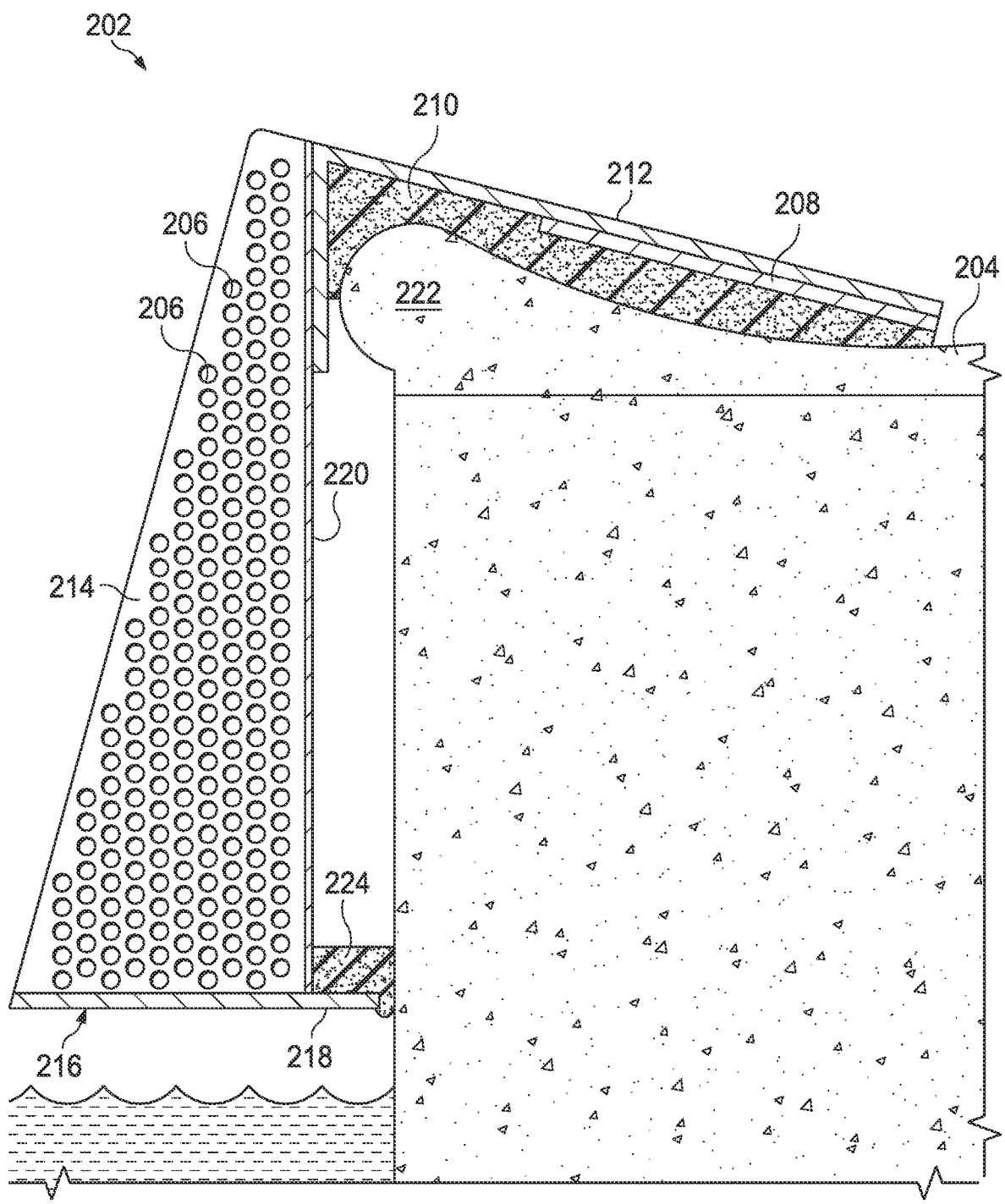
FIG. 3 is a side view of another embodiment of a bracket hanging from an edge of a pool structure.

FIG. 3 illustrates an embodiment of a bracket 202 in place on a pool structure 204. The bracket 202 includes the hanger lip 212, side frame 214, horizontal support 216, foot 218 and vertical strut 220. This embodiment also includes a pad 224 on the foot 218.

The hanger lip 212 of the bracket 202 extends over the coping 222 of the pool structure 204. The coping 222 in this embodiment includes a curved nose, which is raised and extended forward. The hanger lip 212 in this embodiment includes a second layer 208 and a malleable layer 210. The second layer 208 provides additional structural support near the distal end of the hanger lip 212 from the vertical strut 220. In some embodiments, the distal end of the hanger lip 212 may include a thicker or stronger section instead of the second layer 208.

The malleable layer 210 may provide a protective layer that forms to the coping 222's curve and forward nose. In some embodiments, the malleable layer 210 may be denser near the distal end of the hanger lip 212 under the second layer 208 and less dense over the nose of the coping 222 to further protect the nose section. The malleable layer 210 may be a rubber, silicone, nylon, plastic, polyurethane or other material or combination of materials.

The hanger lip 212 is also shown to be longer than the prior hanger lip 112. This allows the distal end of the hanger lip 212 to apply pressure to the pool structure 204, instead of applying pressure directly to the nose of the coping 222. The hanger lip 212 also includes a downward angle toward the distal end in this embodiment to further direct pressure to the body of the pool structure 204 instead of the nose of the coping 222.

The hanger lip 212 hangs over the coping 222 from the pool structure 204 into the opening of the pool structure 204. When the bracket 202 hangs from the pool structure 204, a gap may be created between the back of the vertical strut 220 and the side surface of the pool structure 204. In this example, the gap between the vertical strut 220 and the side surface of the pool structure 204 is larger because of the extended nose of the coping 222.

The side frames 214 in this embodiment include a plurality of openings or holes 206. These holes 206 may reduce the weight of the bracket 202 without reducing the strength of the bracket 202. In addition, the holes 206 may allow water movement around and through the side frames 214 in submersible embodiments. The holes 206 may also allow a user to confirm that a beam is properly situated in the bracket 202. Like the other brackets, side frames 214 are spaced apart to hold a beam aligned above the horizontal support 216. The space between side frames 214 also ensures the beam is properly oriented in the bracket 202. For example, the spacing of side frames 214 may ensure the beam is vertically oriented as illustrated in FIG. 1.

Figure 4:
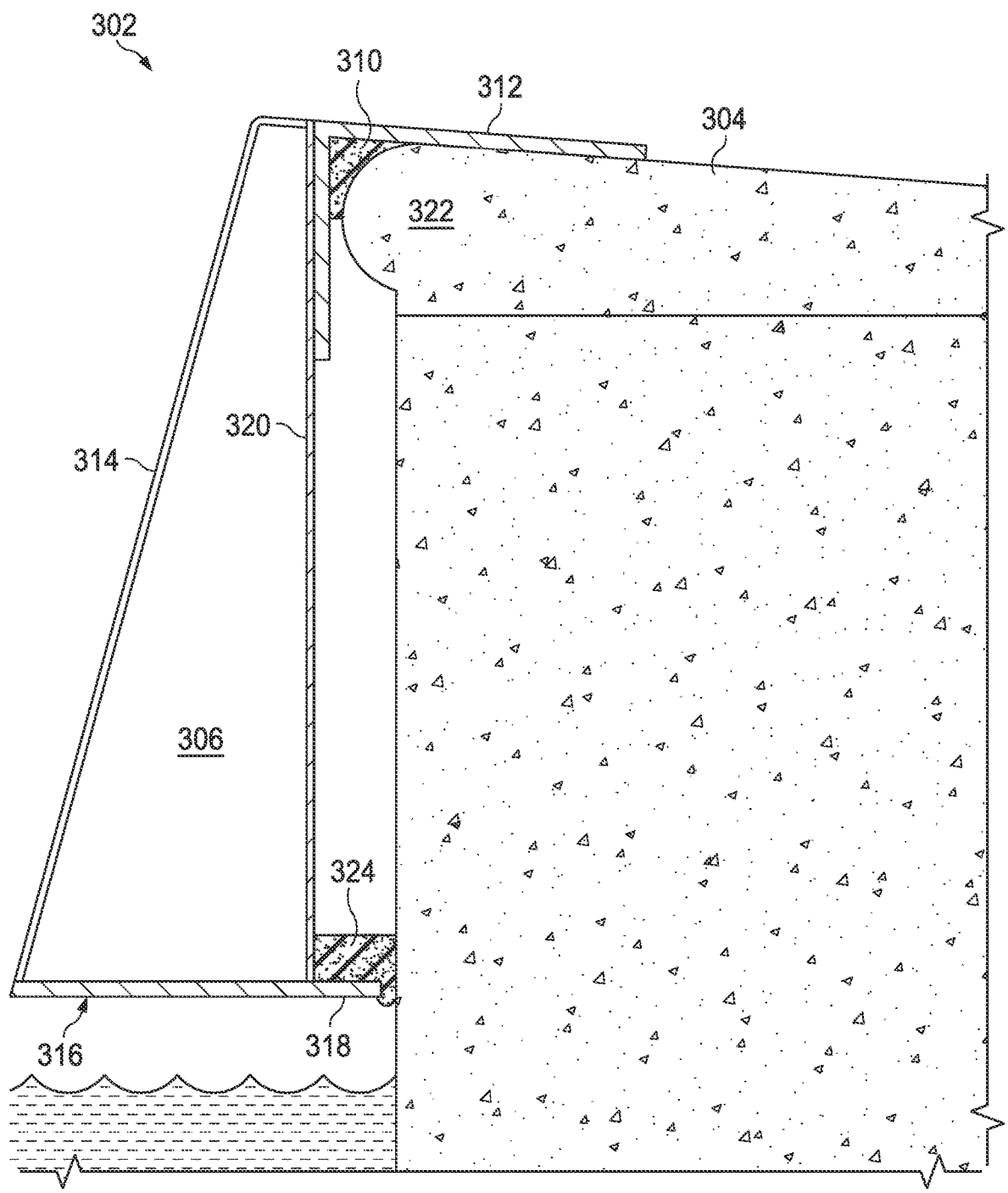
FIG. 4 is a side view of another embodiment of a bracket hanging from an edge of a pool structure.

FIG. 4 illustrates an embodiment of a bracket 302 in place on a pool structure 304. The bracket 302 includes the hanger lip 312, side frame 314, horizontal support 316, foot 318 and vertical strut 320. This embodiment also includes a pad 324 on the foot 318.

The hanger lip 312 of the bracket 302 extends over the coping 322 of the pool structure 304. The coping 322 in this embodiment includes a curved nose, which is extended forward and the top surface of the pool structure 304 is at a slight incline to the nose of the coping 322. In this embodiment, the bracket 302 includes a malleable layer 310 under the hanger lip 312 adjacent to the vertical strut 320. The malleable layer 310 may provide a protective layer that forms to the coping 322's forward nose. The malleable layer 310 may be a rubber, silicone, nylon, plastic, polyurethane or other material or combination of materials.

In this embodiment, the hanger lip 312 is longer than hanger lip 112 and shorter than hanger lip 212. The hanger lip 312 is configured to be a sufficient length to allow the hanger lip 312 to apply pressure to the pool structure 304, instead of applying pressure directly to the nose of the coping 322. The hanger lip 312 also includes a downward angle toward the distal end in this embodiment to correspond with the incline of the pool structure 304 toward the nose of the coping 322.

The hanger lip 312 hangs over the coping 322 from the pool structure 304 into the opening of the pool structure 304. When the bracket 302 hangs from the pool structure 304, a gap may be created between the back of the vertical strut 320 and the side surface of the pool structure 304. This gap accommodates the extended nose of the coping 322.

The side frames 314 in this embodiment are bars or rods that extend from around the top of the vertical strut 320 to the edge of the horizontal support 316 away from the pool structure 304. These side frames 314 define an open area 306 between the side frames 314 and the vertical strut 320, and thereby may reduce the weight of the bracket 302 without reducing the strength of the bracket 302. In addition, the open area 306 may allow water movement around and through the side frames 314 in submersible applications. The open area 306 may also allow a user to confirm that a beam is properly situated in the bracket 302. Like the other brackets, side frames 314 are spaced apart to hold a beam aligned above the horizontal support 316. The space between side frames 314 also ensures the beam is properly oriented in the bracket 302. For example, the spacing of side frames 314 may ensure the beam is vertically oriented as illustrated in FIG. 1.

Figure 5:
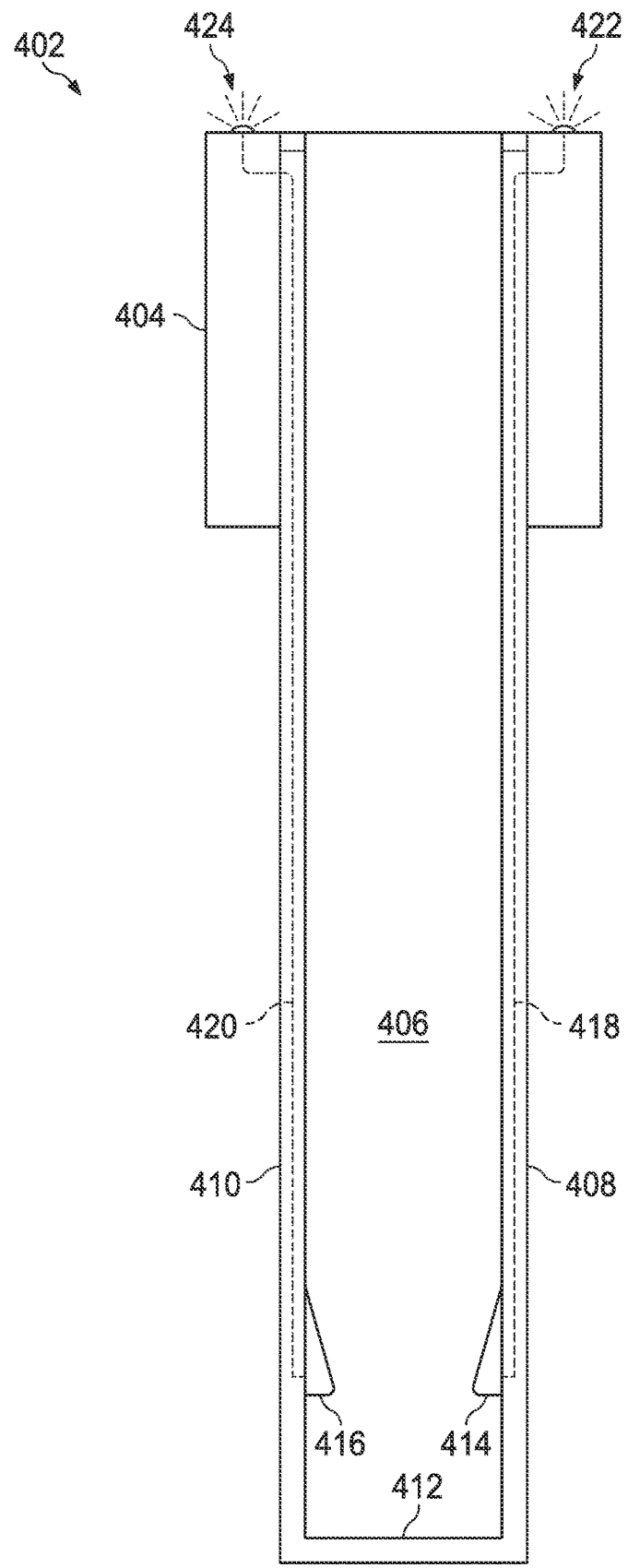
FIG. 5 is a front view of an embodiment of a bracket with a switch system.

FIG. 5 illustrates another embodiment of a bracket 402. This bracket 402 includes a hanger plate 404, which connects to a hanger lip (not shown in this view). The hanger plate 404 extends downward forming vertical strut 406 to the horizontal support 412.

The bracket 402 includes side frames 408 and 410. The side frame 408 includes a switch 414 connected by a wire 418 to output 422. The side frame 410 includes a switch 416 connected by a wire 420 to output 424. The outputs 422 and 424 may be visual, such as lights (LEDs, conventional or other types), audio, such as speakers, or other types of outputs. In some embodiments, the outputs 422 and 424 may be operably controlled with a mechanical connection or a wireless connection instead of the wires 418 and 420.

In some embodiments, the switches 414 and 416 are depressed when a properly sized beam is properly placed in the bracket 402. When the switches 414 and 416 are depressed, the corresponding outputs 422 and 424 are turned on or set to indicate a proper connection. In some embodiments, the outputs 422 and 424 may indicate a correct placement using one output (e.g., a green color or a bell sound) or an incorrect placement using a second indication (e.g., a red color or buzzer sound).

As an example, if someone places a one inch board in the bracket 402, which is sized for a two inch board, both switches 416 and 418 may fail to be properly depressed or one may depress while the other does not. The user may see that only one or neither output 422 and 424 shows a proper indication.

In some embodiments, the beam and bracket 402 may be configured to fit together. The beam may include a pair of divots corresponding to the spacing and placement for the switches 414 and 416. When the beam is placed, the beam first causes the switches 414 and 416 to depress before expanding into the corresponding divots a partial distance. The bracket 402 may confirm that the switches 414 and 416 depress before expanding partially. Once confirmed, the outputs 422 and 424 may show lights to indicate proper beam placement. In addition, the structure of the switches 414 and 416 may engage the divots in a beam to form a latch to hold the beam in place from horizontal movement.

In some embodiments, the beam may include a corresponding port to form a connection to indicate proper placement. For example, the switches 414 and 416 may include contacts that correspond to a metal plate on the beam. When the beam is properly aligned, the metal plate completes the connection on the switches 414 and 416 to power the outputs 422 and 424. Other sensors may be used in place of the switches 414 and 416 in some embodiments.

In some embodiments, the outputs 422 and 424 may wirelessly connect to a mobile application or other electronic device to confirm proper installation of the cover system. For example, when the switches 414 and 416 are depressed, the bracket 402 may send a signal over low energy Bluetooth communication to a smartphone or tablet to indicate proper installation.

Figure 6:
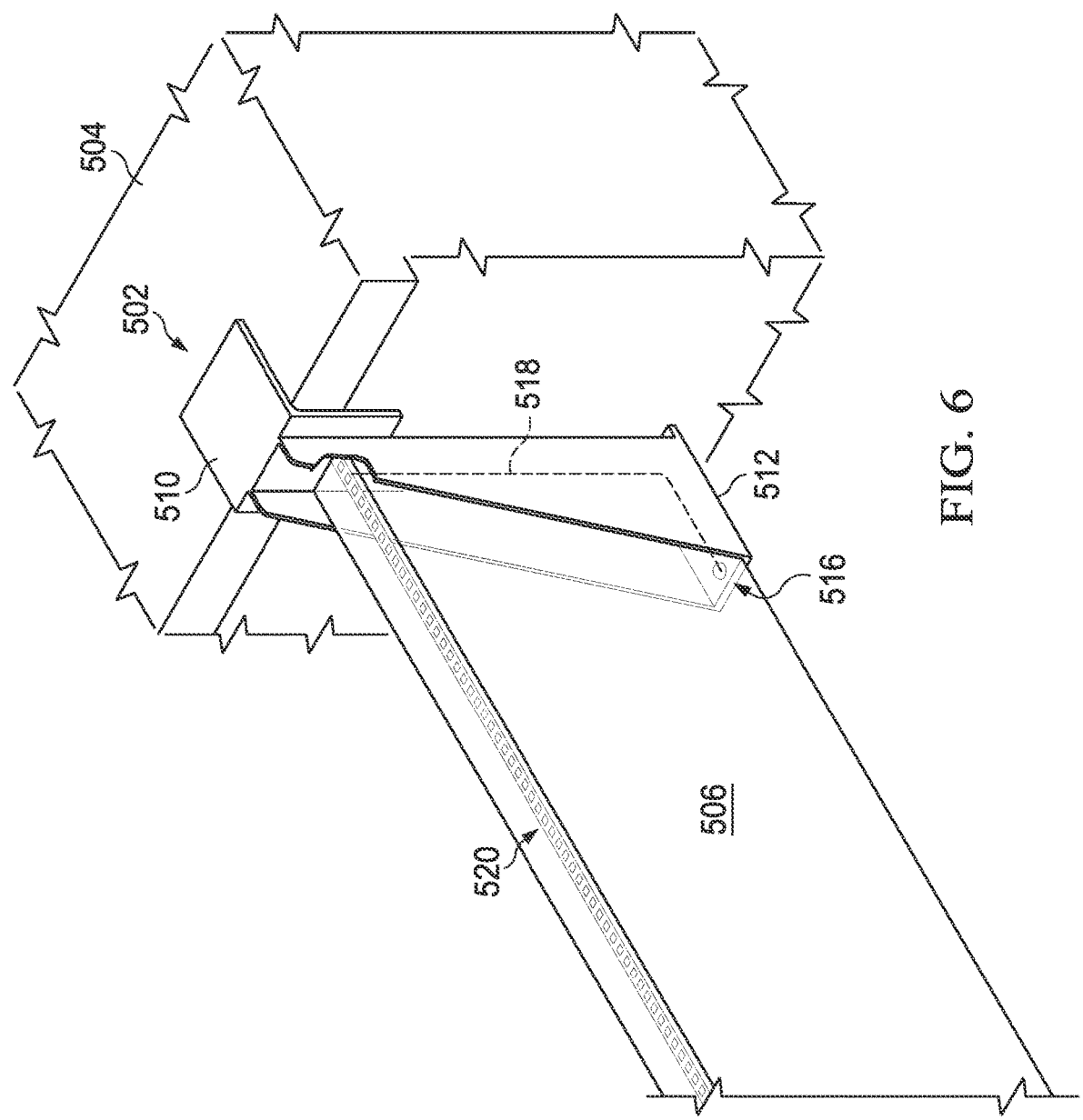
FIG. 6 is a perspective view of an embodiment of a bracket hanging from an edge of a pool structure with a beam.

FIG. 6 shows a close-up perspective view of a bracket 502 hanging from a pool structure 504 with a beam 506. The bracket 502 includes a hanger lip 510 over the edge of the pool structure 504 and a horizontal support 512, which supports the beam 506.

In this embodiment, the bracket 502 includes a sensor 516 on the horizontal support 512. The sensor 516 may be a pressure sensor, temperature sensor, movement sensor or other type of sensor. As an example, the sensor 516 may be used to measure pressure during installation and monitor the pressure during use. A plurality of sensors 516 throughout the covering system may be used to provide confirmation that beams 506 are properly installed and safe to use as a flooring system. In addition, the sensors 516 may monitor threshold conditions during use of the flooring system. For example, the sensors may operate with a monitoring application to ensure that excess weight is not placed on the flooring system.

The sensor 516 may be part of a raised nodule or protrusion in some embodiments corresponding to a divot or indention in the bottom of the beam 506. The beam 506 may be placed into the bracket 502 to fit over the protrusion to limit the horizontal movement of the beam 506.

The sensor 516 may be a connector in some embodiments to create an attachment to the beam 506. In such an embodiment, the sensor 516 may be a contact sensor to ensure proper connection between the beam 506 and the bracket 502. In addition, the connection may provide power to the beam 506. For example, the raised nodule on the horizontal support 512 may be configured to fit into the corresponding indention of the beam 506 to form an electrical connection. The nodule and indention may include a sealing ring or cover configured to form a waterproof seal when the beam is properly connected to the bracket.

In this embodiment, the beam 506 includes an electrical connection in the form of a wire 518 to an output. In this embodiment, the output is shown as an LED strip 520. In other embodiments, the output may be other light systems, audio systems, vibratory systems or other systems. These output systems may be used for additional aesthetics and entertainment purposes. In such embodiments, the floor panels for this design may be a clear or transparent material to allow the light from LED strip 520 to be visible through the floor.

In other embodiments, these output features may be powered or controlled by internal power sources, control processors and wireless communications. In such embodiments, the sensor 516 may not form an electrical connection with the beam 506.

Figure 7:
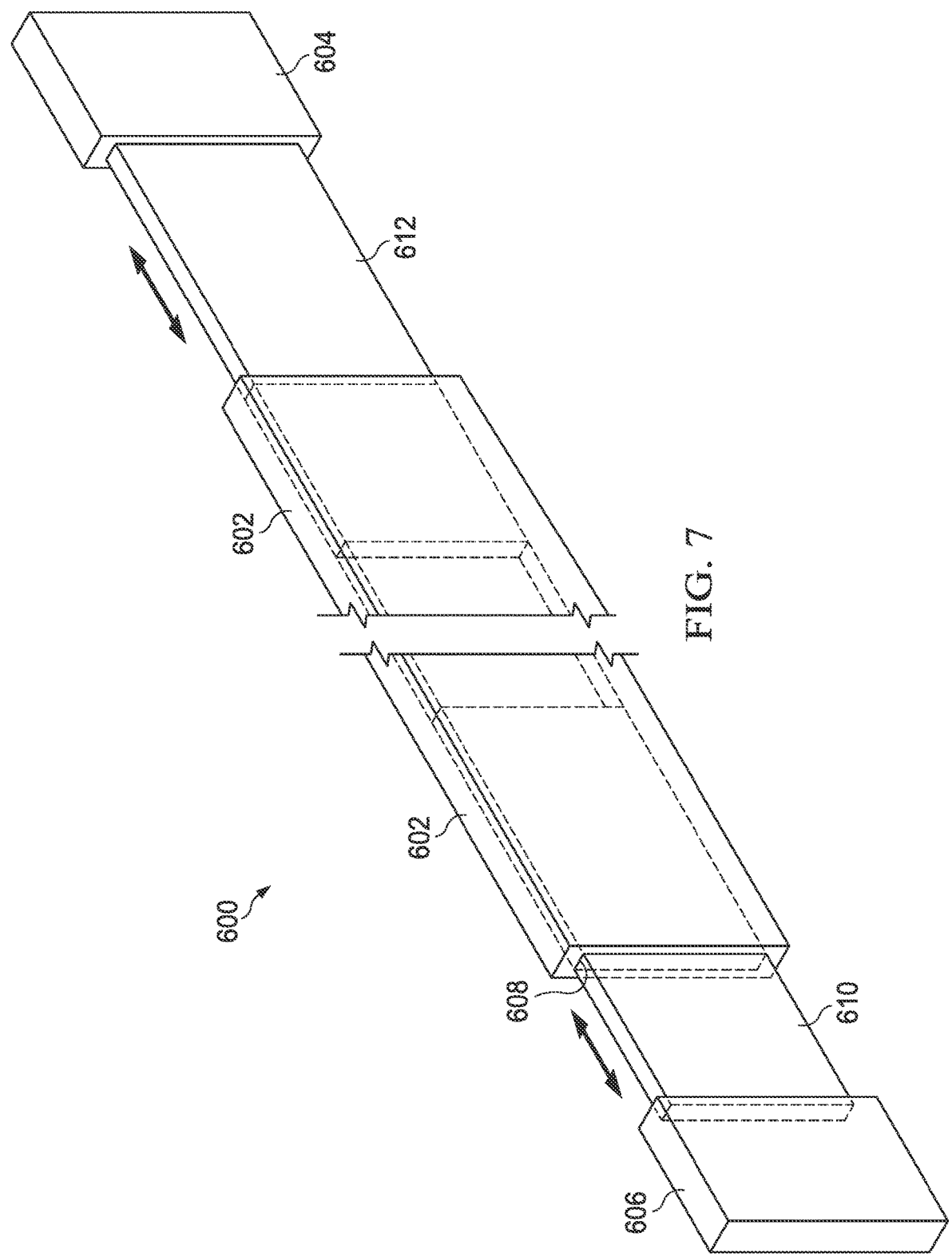
FIG. 7 is a perspective view of an embodiment of an adjustable beam.

FIG. 7 shows an embodiment of a beam 600 that has an adjustable length. The beam 600 includes a central frame 602, a first end 604 and second end 606. The second end 606 includes a second extension 610 that fits inside an opening 608 of the central frame 602. The first end 604 also includes a first extension 612 that fits in the opposite side of the opening 608 in the central frame 602.

In some embodiments, the opening 608 may extend the full length of the central frame 602. In other embodiments, the opening 608 may only extend partially into each side of the central frame 602 in order to allow the extensions 610 and 612 to fully fit into the central frame 602. In addition, the central frame 602 and extensions 610 and 612 may have corresponding features, such as protrusions and channels, that prevent removal of the extensions 610 and 612 from the central frame 602. The opening 608 and the extensions 610 and 612 are sized to fit tightly together while allowing horizontal movement to adjust the length of the beam 600. The tight fit significantly limits the vertical movement and any flex between the central frame 602 and ends 604 and 606.

The beam 600 is made from rigid materials in most embodiments configured to maintain the structural integrity along the length of the beam 600 regardless of the state of extension. In some embodiments, a semi-rigid material may be used for the beam 600 as long as it maintains the structural integrity within an allowable deviation. In some embodiments, the beam 600 may provide a rigid or near-rigid vertical support even if the material allows flexibility in the perpendicular plane to the length of the beam 600. When installed, cross members may be connected to the beams 600 to minimize or eliminate perpendicular movement.

The beam 600 may be formed from wood, metal, Plexiglas®, plastics, polycarbonates, plastic Lumber fortified with fiberglass, polyethylene (HDPE or LDPE) plastic, PVC (polyvinyl chloride) or combinations of materials. For example, the central frame 602 may be formed from a metal while the ends 604 and 606 are a Plexiglas® material with embedded metal poles in the extensions 610 and 612.

Figure 8:
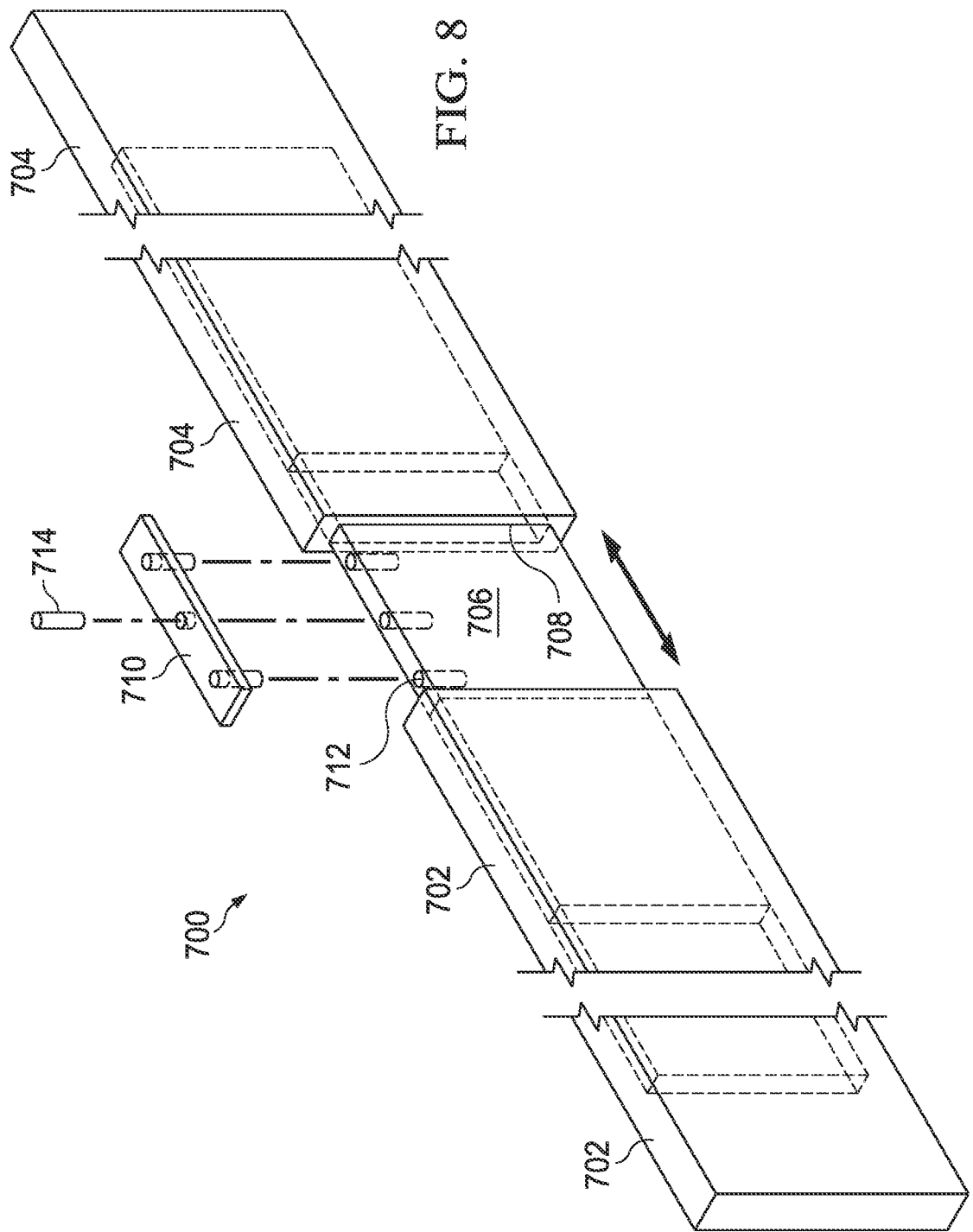
FIG. 8 is a perspective view of another embodiment of an adjustable beam with a spacer.

FIG. 8 shows an alternative beam 700 that is extendable. The beam 700 includes a first end frame 702 and a second end frame 704 connected by a central joist 706. Each end frame 702 and 704 includes an opening 708 in which the central joist 706 fits.

The beam 700 may be expanded from a smallest length, with end frames 702 and 704 in contact and fully encompassing the central joist 706, to a fully expanded length in which the end frames 702 and 704 are separated and only overlap the central joist 706 a sufficient amount to minimize or prevent the beam 700 from over-flexing. The extent of needed overlap may depend on the materials used in the end frames 702 and 704 and central joist 706. For example, minimal overlap may be sufficient for strong and rigid metals, while significant overlap may be needed for polycarbonates.

In addition, this embodiment includes a spacer 710 designed to fit on top of the central joist 706 in the gap between the first end frame 702 and the second end frame 704. The height of the spacer 710 is designed to level the top surface of the beam 700 across the gap to match the level of the top surface of the end frames 702 and 704. A pool covering system may include multiple optional spacers 710 having different lengths to correspond with potential gaps formed in the expandable beam 700.

The spacer 710 connects into openings 712 in the central joist 706 using connectors 714. In some embodiments, the connectors 714 may be pegs that are fitted to openings 712. The connectors 714 may be built into the spacer 710 in some embodiments. In other embodiments, the spacer 710 is designed for the connectors 714 to engage both the spacer 710 and the openings 712. The connectors 714 may be any type of connector able to hold the spacer 710 to the central joist 706, such as screws, bolts, nails, a locking peg, friction connectors and other connectors. The openings 712 may correspond to the connectors 714. For example, openings 712 may be guide holes to lead screws. As another example, the opening 712 may be a channeled opening corresponding to a locking peg with one or more protrusions to lock into grooves in the opening.

During installation, the beam 700 may be lengthened by moving the first end frame 702 and/or the second end frame 704 apart to fit in between two brackets on opposite sides of an opening. The spacer 710 may be attached to the top surface of the center joist 706 using connectors 714 and corresponding openings 712 to secure the spacer 710. The spacer 710 also keeps the end frames 702 and 704 separated to the proper length for the beam 700 during installation.

Figure 9:
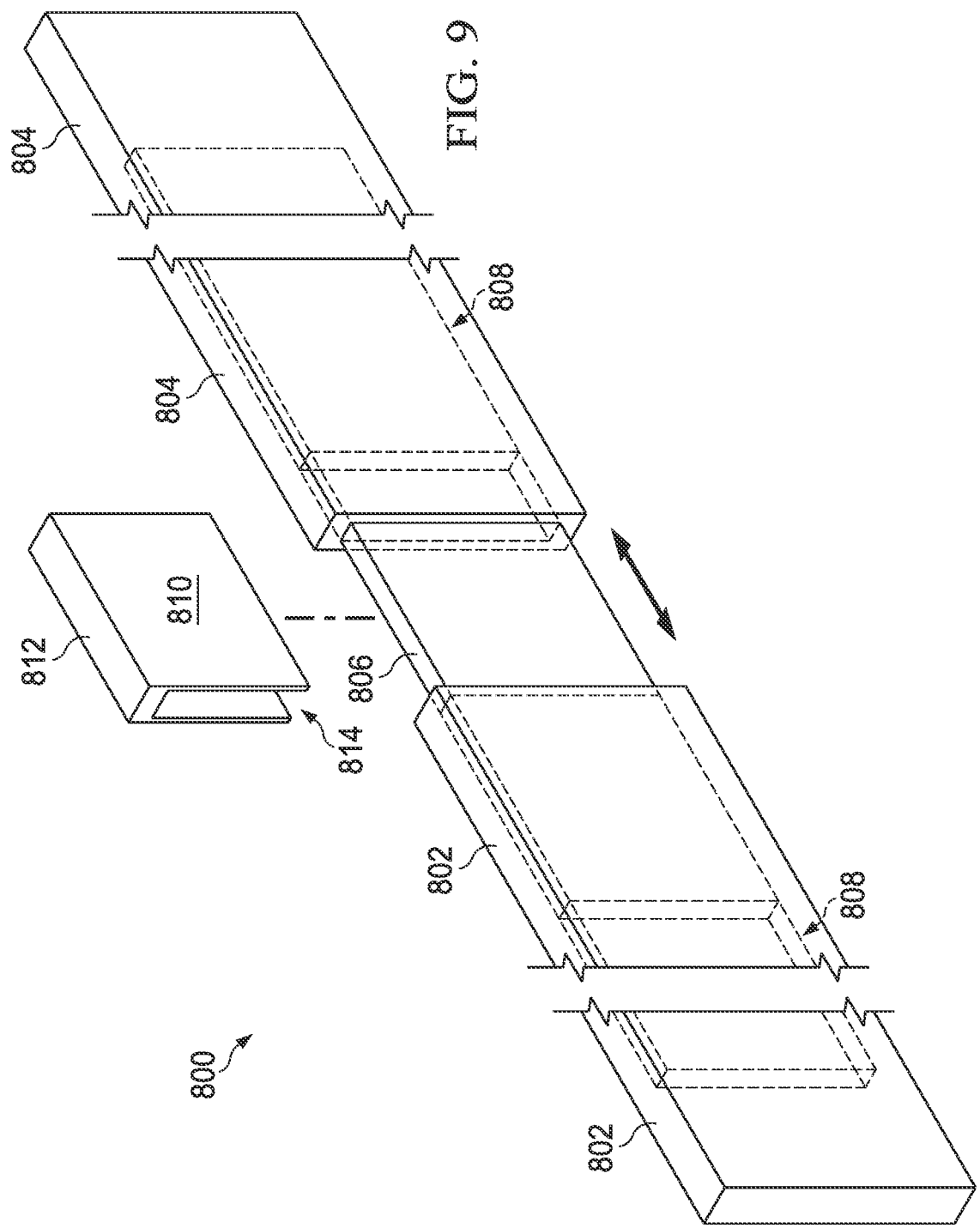
FIG. 9 is a perspective view of another embodiment of an adjustable beam with another spacer.

FIG. 9 shows an alternative beam 800 that is adjustable. The beam 800 includes a first end frame 802 and a second end frame 804 connected by a central joist 806. Each end frame 802 and 804 includes an opening 808 in which the central joist 806 fits and slides. As illustrated by the dashed lines, the opening 808 extends into each end frame 802 and 804 to allow the center joist 806 to move.

The beam 800 may be expanded from a smallest length, with end frames 802 and 804 in contact and fully encompassing the central joist 806, to a fully expanded length in which the end frames 802 and 804 are separated and only overlap the central joist 806 a sufficient amount to minimize or prevent the beam 800 from over-flexing. The extent of needed overlap may depend on the materials used in the end frames 802 and 804 and the central joist 806. For example, minimal overlap may be sufficient for strong and rigid metals, while significant overlap may be needed for polycarbonates.

The central joist 806 is shown off center with a smaller overlap section within end frame 804 than the overlap section in end frame 802. In addition, the end frames 802 and 804 may vary in length as indicated by the broken spacing in the beam 800. While this variability in overlap is shown in the end frames 802 and 804, the central joist 806 may also vary in length. The central joist 806 and end frames 802 and 804 may vary in length together.

In addition, this embodiment includes a spacer 810 designed to fit over the top of the central joist 806 in the gap between the first end frame 802 and the second end frame 804. In this embodiment, the spacer 810 includes a top 812 and two sides defining an opening 814 to fit over the central joist 806. The thickness of the top 812 of the spacer 810 is designed to level the top surface of the beam 800 across the gap to match the level of the top surface of the end frames 802 and 804. In addition the sides of the spacer 810 may correspond to the thickness of the sides of the end frames 802 and 804 to create a consistent appearance for the entire beam 800. A pool covering system may include multiple optional spacers 810 having different lengths to correspond with potential gaps formed in the expandable beam 800. In some embodiments, some spacers 810 may allow for variable lengths to fit a variety of gaps and to accommodate a variety of pool sizes and shapes.

The spacer 810 may prevent the end frames 802 and 804 from sliding inward and shortening the beam 800 from the desired length. In some embodiments, the spacer 810 may include a connector or other feature to connect the central joist 806 to the end frames 802 and 804. In this embodiment, the spacer 810 may also prevent the end frames 802 and 804 from separating and lengthening the beam 800.

Figure 10:
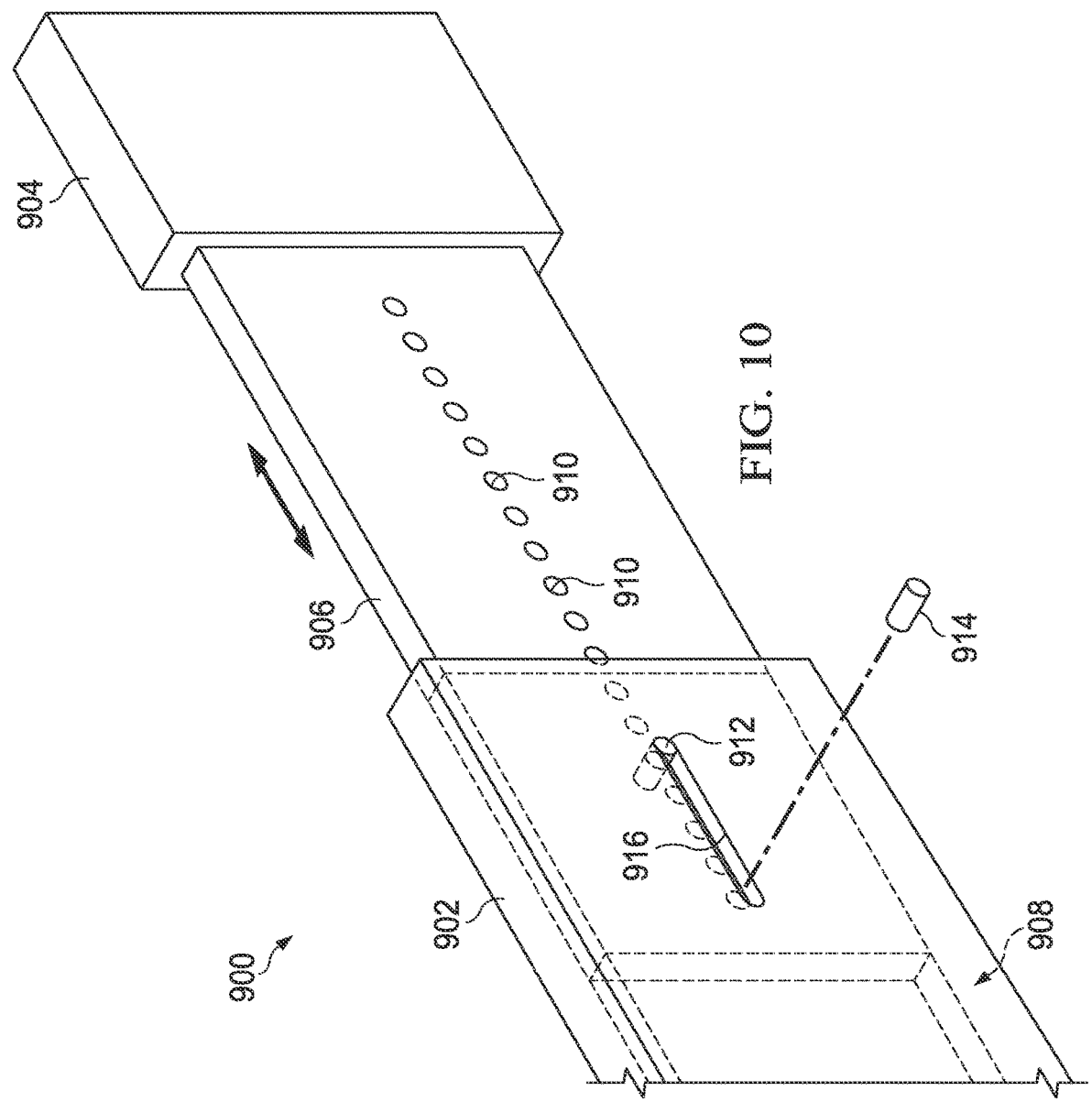
FIG. 10 is a perspective partial view of another embodiment of an adjustable beam.

FIG. 10 shows one end of a beam 900 that is adjustable. The beam 900 includes a central frame 902 and a first end 904, which includes a first extension 906. The beam 900 may include a second end with a second extension on the opposite end that is not shown. The central frame 902 includes an opening 908 in which the first extension 906 slides to allow adjusting the length of the beam 900.

In this embodiment, the first extension 906 includes a series of openings 910 spaced along a portion of the length of the first extension 906. Connectors, such as pegs 912 and 914, may be configured to fit into the openings 910. In other embodiments, connectors may be any type of connector able to limit the lateral movement of the first extension 906 relative to the central frame 902, including screws, bolts, clips, friction fittings, locking fittings or other connectors.

The central frame 902 includes a channel 916 aligned with openings 910. Different openings 910 are accessible based on the extended length of the first end 904. When the first end 904 is in place, the first peg 912 and the second peg 914 are placed in openings 910. The first peg 912 may be placed in the opening 910 in the channel 916 closest to the first end 904 and the second peg 914 may be placed in the opening 910 in the channel 916 furthest from the first end 904. These pegs 912 and 914 then limit the lateral movement of the first end 904 relative to the central frame 902 and thereby maintain the desired length of the beam 900.

In some embodiments, the openings 910 may be spaced a defined distance apart, such as one inch, to allow the user to adjust the beam 900 to a specified length using the openings for measurement. In such embodiments, the openings may be labeled with their distance adjustments for ease of use. In other embodiments of adjustable beams 900, the adjustment measurements may be placed on the surface of the extension apart from the openings 910.

In some embodiments, the first extension 906 may include a permanent protrusion or peg within a corresponding channel 916 designed to limit the overall adjustment capability of the beam 900. This option may be used to ensure sufficient structural overlap is consistently maintained.

Figure 11:
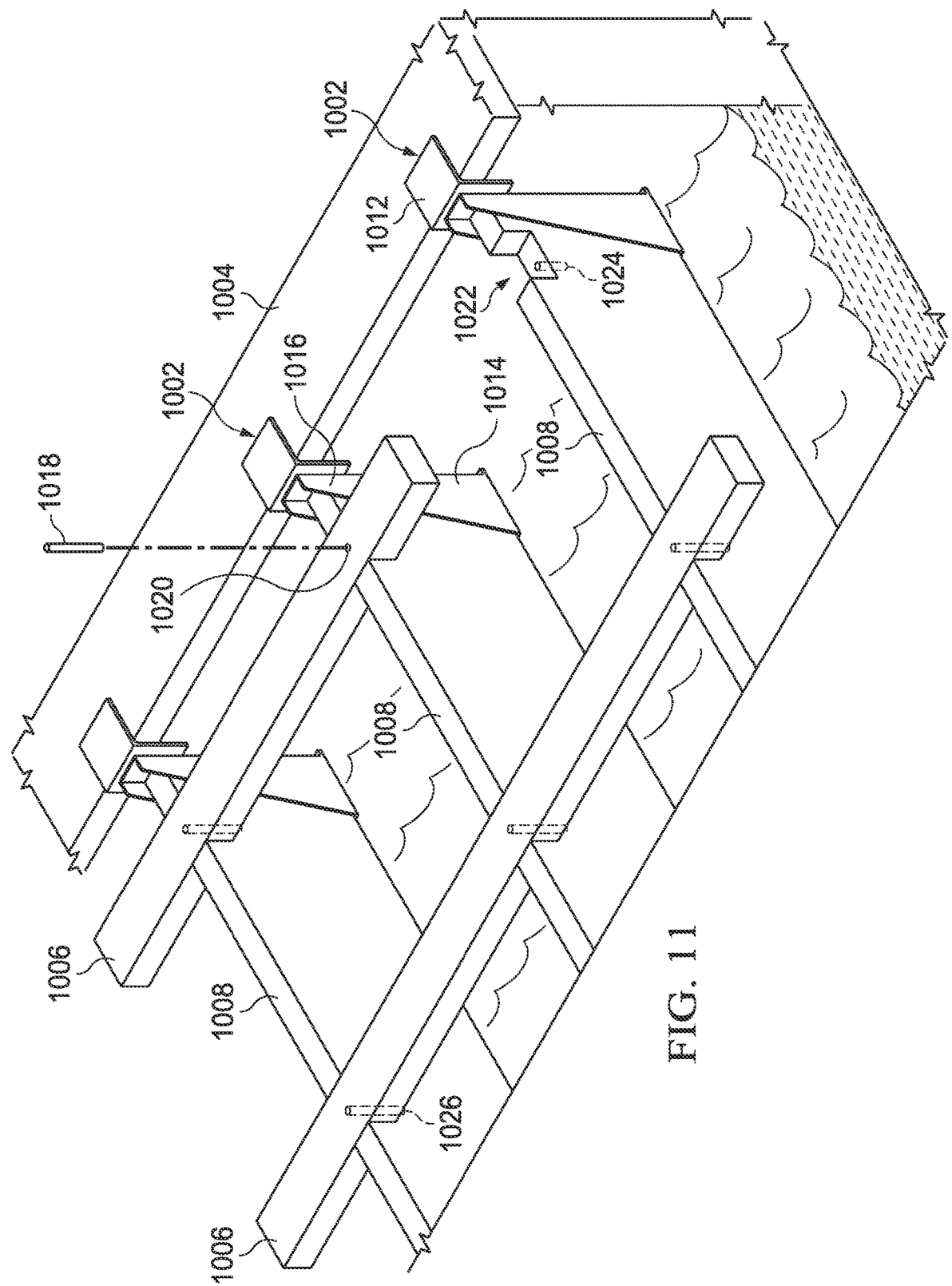
FIG. 11 is a perspective view of another embodiment of a pool covering system.

FIG. 11 shows a partial implementation of a pool covering system. This embodiment includes a series of brackets 1002 hanging from the pool structure 1004. The brackets include a hanger lip 1012, side frame 1014, horizontal support (not shown) and other features described with other bracket embodiments. In this embodiment the upper portion 1016 of side frames 1014 is marked to indicate where the top surface level of the beams 1008 crosses the side frames 1014.

The brackets 1002 hold beams 1008, which support cross members 1006. In this embodiment, the beams 1008 and cross members 1006 are designed to collectively provide a flat or nearly flat top surface to support a floor or subfloor layer. In this embodiment, the beams 1008 include notches 1022 into which the cross members 1006 fit. The depth of each notch 1022 corresponds with the thickness of the cross member 1006 in order to form a flat top surface.

In this embodiment, each cross member 1006 includes a series of member openings 1020 spaced along the length of the cross member 1006. The member openings 1020 may be spaced a predetermined amount for each beam 1008 as shown in this figure. In other embodiments, the series of member openings 1020 may provide alternative spacing options that allow for varied beam 1008 spacing. In some embodiments, the member openings 1020 may be a channel or series of connected openings to allow small variations in beam 1008 spacing. The beams 1008 include beam openings 1024 in the notches 1022, which correspond with the member openings 1020.

This embodiment includes connectors 1018 and 1026. For illustrative purposes, connector 1018 is shown above the member opening 1020 while connector 1026 is shown in the member opening 1020 and the beam opening 1024. Connectors 1018 and 1026 may be any type of connector, including pegs, screws, bolts, friction connectors, locking connectors, snap-fit connectors, nails or any other connector capable of holding the cross member 1006 in place with the beam 1008. As discussed above, openings 1020 and 1024 may be designed to fit or guide connectors 1018 and 1026 into place. In this embodiment, connectors 1018 and 1026 are pegs that prevent the cross members 1006 from moving in a lateral direction along the length of the cross member 1006. The notches 1022 prevent the cross members 1006 from moving side to side along the length of the beam 1008.

In some embodiments, the pegs 1018 and 1026 may be pre-connected or integrated into the cross members 1006 or beams 1008. The corresponding component would have the opening 1020 or 1024 into which the peg 1018 or 1026 fits.

In other embodiments, the cross members 1006 may include a series of cross member notches corresponding to notches 1022. In such embodiments, the combined depth of notches 1022 and cross member notches may cause the top surfaces of the beams 1008 and cross members 1006 to be flat or nearly flat. The overlapping sections for both sets of notches prevent cross member 1006's lateral and side-to-side movement. In such embodiments, connectors 1018 and 1026 may not be necessary or included in the system.

In this embodiment, the beams 1008 and cross members 1006 form an intertwined grid with a flat or nearly flat top surface. The common flat surface increases the surface area of the top surface for supporting a floor or subflooring material. This additional surface area can provide increased structural support allowing for alternative flooring options. For example, a thinner Plexiglas® panel may be used as a floor directly on the top surface in this embodiment.

In some embodiments, the floor panels may include grooves corresponding to the top portion 1016 of the side frames 1014 that extend over the grid top surface of the beams 1008 and cross members 1006. These grooves may allow the floor surface to reach the edge of the pool structure 1004 and limit movement of the panels. This may facilitate a flooring surface that is level or nearly level with the top surface of the pool structure 1004.

In other embodiments, the top portion 1016 of the side frames 1014 may be left off the bracket 1002, which makes the top of side frames 1014 level or below the grid's top surface. In this embodiment, flooring panels may also extend to the edge of the pool structure 1004 and provide a level or nearly level top surface with the top surface of the pool structure 1004.

In other embodiments, additional leveling spacers may provide an alternative option to a subfloor by creating a similarly level top surface grid. The leveling spacers may fit on top of the beams in the space between cross members.

In some embodiments, the beams 1008 and cross members 1006 may include output features, such as lights, speakers or other outputs. The beams 1008 may receive power from one or more of the brackets 1002. The beams 1008 may transfer power to cross members 1006 through the connectors 1018 and 1026.

Figure 12:
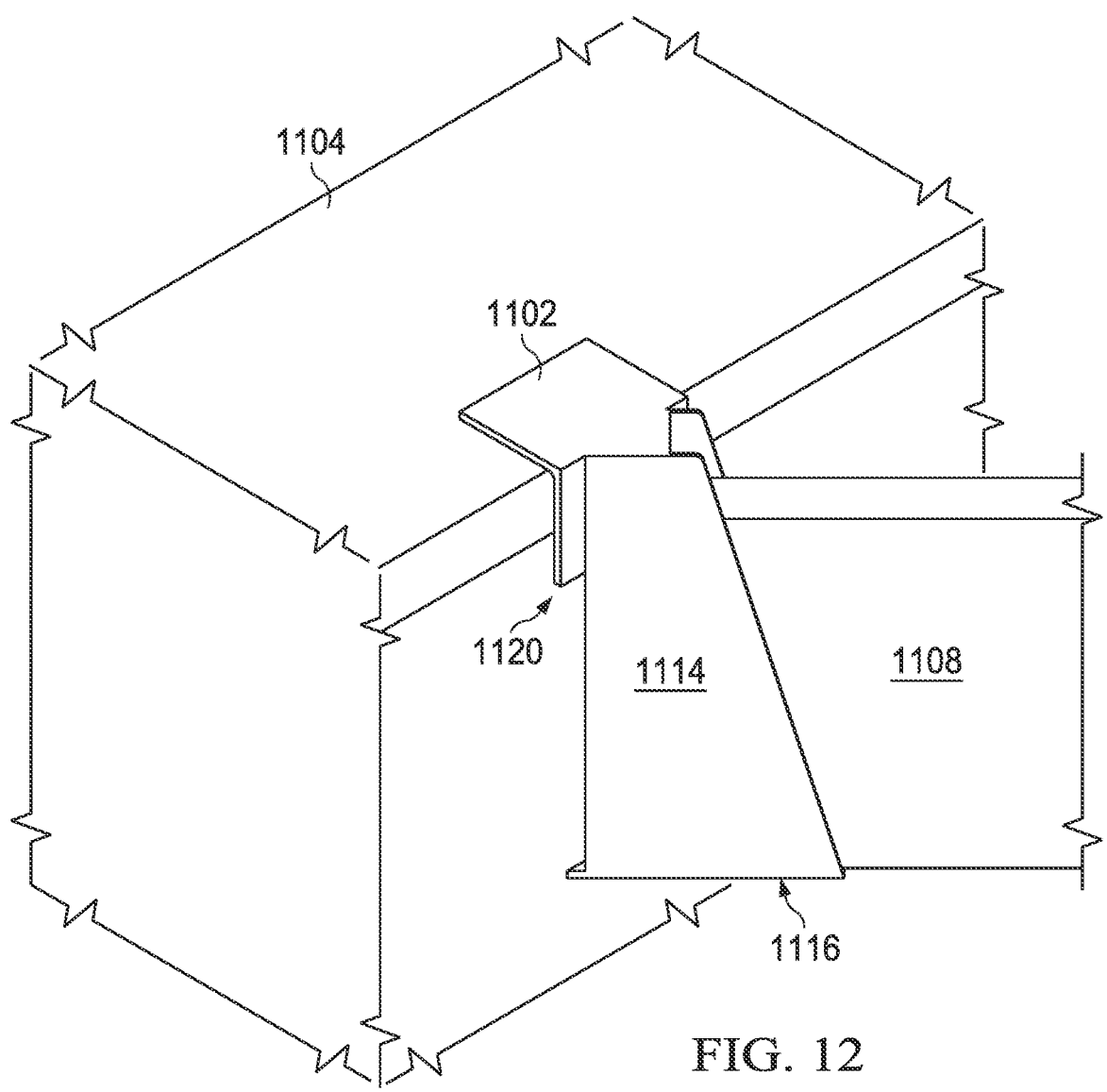
FIG. 12 is a perspective view of an embodiment of an angled bracket hanging from a pool structure.

FIG. 12 shows a close-up perspective view of a bracket hanging from a pool structure 1104 with a beam 1108. The bracket includes a hanger lip 1102 over the edge of the pool structure 1104, a hanger plate 1120, side frames 1114 and a horizontal support 1116, which supports the beam 1108. In this embodiment, the bracket is angled relative to the hanger plate 1120 and the wall of the pool structure 1104. The angled bracket allows the pool covering structure to be installed in pools having curves or angled features in their design.

In some embodiments, the hanger lip 1102 may be larger in width or depth to increase overlap with the top surface of the pool structure 1104. This may be more important for curved pool structures 1104 that may create a gap based on the hanger plate 1120 shape. In some embodiments, the hanger plate 1120 may have a curved back to correspond to a pool structure 1104 and minimize the distance between the back of side frames 1114 and the wall of the pool structure 1104. The angled bracket may also include a foot behind the horizontal support 1116, which is angled to correspond with the hanger plate 1120 and the wall of the pool structure 1104.

In some embodiments, the angled bracket may be a solid or rigid structure having a set angle. In other embodiments, the angle of the bracket may be adjustable. For example, the bracket may include a vertical strut having a rotatable connection to the hanger plate 1120, which provides support to the horizontal support 1116 and side frames 1114. The side frames 1114 and horizontal support 1116 may rotate with the vertical strut. In other embodiments, the vertical support may be rigidly connected to the hanger plate 1120 and the side frames 1114, and the horizontal plate 1116 may have a rotatable connection to the vertical strut.

Rotatable connections may be created using hinges, bearing based fittings, geared structures, or other structural rotatable connections. The connection may be freely rotatable or allow specific positions that lock or hold their orientation. As an example, the vertical strut may have a post that has a rotatable connection to the hanger plate 1120. The post may have a portion with gears or a polygonal shape corresponding to a section of the hanger plate 1120 connection. The vertical strut may be lifted and rotated into place and lowered letting the shaped sections engage to prevent further rotation movement of the angled bracket.

Some embodiments of a pool covering system may include a dual beam bracket having a wider space between side frames to hold wider beams or to hold two beams next to each other. In some embodiments, a dual beam bracket may include a central frame between the outer side frames to allow the users to guide each of two beams into place. The dual beams may be used for places needing extra support, such as below a known location for a high-weight item (e.g., a main tent post). In addition, the dual beams may be used for longer spans, or angles that require alternative supporting designs. For example an "L" shaped pool may use a dual beam to support additional brackets for beams covering the corner of the pool shape.

Some embodiments may include a support bracket to facilitate a vertical support post. A vertical support post may be used to provide an additional support feature to help prevent any bending or flexing in the middle of a beam. The bracket may include an open tube through which the vertical post passes until it presses against the bottom of the pool. When it is against the bottom of the pool, a latch, cotter pin, bolt or other connector may be used to secure the vertical support post in place. The vertical support post may be made of a waterproof or water resistant material or have a coating to protect the pool structure and water, while providing the security of ancillary vertical support to limit any undesired bowing of the beams.

In some embodiments, the pool covering system may include a vertical post support designed to hold the ends of two separate beams in the middle of the pool. The vertical post support may include a waterproof material or coating on the post and on a base support. The top of the vertical post support may include a U-bracket having a horizontal support and two side frames to hold the ends of two beams. The vertical support may also include a latching or connection system to hold the ends in place. In some embodiments, the vertical post support may be designed to hold a pair of beams next to each other to provide a stronger support system. A series of adjustable vertical supports may be used to support multiple beams in series to span longer stretches and to accommodate larger pools, such as a competition pool.

In some embodiments, the pool covering system may be used to convert pool spaces into alternative use spaces. For example, a natatorium pool at a school, fitness club or other exercise or recreational facility may be covered with the pool covering system, allowing the space to be converted to an auditorium space or activity space. The pool covering system provides an approximately level space across the pool and pool structure. In some embodiments, components of the pool covering system, such as the floor panels, may incorporate designs or colors corresponding to the building or the use of the building, such as school colors or logos.

Some embodiments may be designed to provide only partial coverage of a pool or other open span. For example, the pool covering system may extend a third of the way over a pool while leaving the remaining two-thirds open for use or aesthetics. In such an embodiment, the brackets and beams may be placed a third of the way along the pool. The cross members and flooring layers only extend to the final beam or just past it to provide the appearance of hanging over the pool. In such embodiments, handrail brackets may be attached to the end of the cross members, flooring layer or the final beam. As an example, a handrail bracket may be a "U" bracket that fits over the beam and includes a post holder on the outer side of the beam with a snap connection to prevent the post from coming out without releasing a snap or latch.

Some embodiments may be designed to bridge a pool or opening temporarily. For example, two beams with corresponding brackets may be placed along the edge of the desired width of a bridge and cross members may be replaced with bridge panels that attach to the beams to form a flat bridge. Separate cross members or subflooring members may be used to increase the support strength for a thinner flooring material. Like the partial covering, handrails may be attached to the bridge.

In some embodiments, arched beams may be used to form an arched bridge spanning the opening. The arched beams may be arched across the top only in some embodiments. In other embodiments, the beams may include corresponding arcs on the bottom. The arc and ends of the beams are configured to direct force onto the horizontal supports on the hanging brackets.

Some embodiments may include an arch attachment configured to fit over a beam that has a flat top, thereby creating an arched surface. The arch may attach to the beam using any connector. For example, a plurality of two-sided pegs may be placed in holes in the beam and the arch may have corresponding holes in the bottom to fit over the pegs. As another example, the bottom of the arch may have U brackets that fit over the beam.

Some embodiments may include vertical post supports, such as the handrail connections. These vertical posts may be used to support items in addition to or instead of the handrails. In some embodiments, the vertical post may be designed to hold an umbrella or other shade or covering feature. For example, a bridge may use a series of vertical posts to support a cover made of fabric, such as canvas, mesh, or other fabric material. Some embodiments may have a pergola feature spanning a portion of the pool.

Some embodiments may include modular features to create many different looks and designs. For example, a bridge may include a handrail system with vertical posts that pass through the flooring into the beams under the floor. These posts may hold the floor in place while also supporting the handrail system. The tops of these posts may include removable caps that allow additional posts to fit into the top extending the height. To create the pergola cover, additional vertical posts may be added to some of the vertical posts to increase height. A cover may be attached to these additional vertical posts to create a pergola. In addition, the system may include decorative features that may be placed in the vertical posts, such as flags, finials and other features.

This modular system may include cuffs, plugs and other features that may be replaceable to provide a variety of options to develop different structures and looks. The beams may include vertical holes to receive corresponding pegs or posts. Some flooring embodiments may include pegs on the bottom that can fit into the holes in the beams. These pegs may be fixed to the bottom of the floor or they may be adjustable. For example, the pegs may be able to slide in order to fit different beam spacing. Other flooring embodiments may have corresponding holes to align with holes in the beams. The flooring may be held in place using other components, such as plugs, posts, cuffs and other features. For example, a user may use a plug to pass through the flooring into the beam in order to provide a flat or nearly flat surface for the floor. As another example, a user may install cuffs, which have a peg base and an open top to receive another item, through the flooring and into the holes in the beams to lock the flooring in place and allow for attaching additional accessories. As another example, vertical posts may be installed directly into the holes in the beam without using a cuff.

The modular system may include multiple, alternative decorative features that are designed to extend the floor vertically or at an angle. In some embodiments, the modular system may include a pair of vertical posts configured to hold an extendable or retractable awning. In other embodiment, the vertical posts may be used to hold activity items, like basketball goals, volleyball nets, and other items. Other components may be used to provide a raised surface, such as a lifeguard chair or pedestal, for a person to use.

Other modular elements may be used to provide shade or rain cover over the flooring. As an example, a pair of flexible tubes may be designed to bend from one cuff or vertical post to another to form a pair of corresponding arches. A cover material may span a section of the arched tubes to provide shade. In addition, certain materials may also provide a rain cover.

While the system has been described in the context of covering pools, the system and components may be used for other applications that involve spanning openings, such as construction or repair applications. For example, the system may be used to create a working floor surface across an open portion of a multi-story room in order to repair ceiling fixtures.

In some embodiments, the bracket may be pre-attached to the beams, allowing the beams and brackets to be placed in one step. In other embodiments, one or more bracket components may be integrated with the beam. For example, the hanger lip may be integrated into the end of a beam to allow the beam to hang across the pool opening.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. A bracket for a pool covering system comprising:
   a hanger lip extending in a first direction, wherein the hanger lip is free of openings for connectors;
   a vertical strut having a top side attached to the hanger lip;
   a horizontal support attached to a bottom side of the vertical strut and extending in a second direction;
   a first side frame;
   a second side frame, wherein the first side frame and the second side frame attach to an upper portion of the vertical strut and extend to a forward portion of the horizontal support away from the vertical strut, and wherein the first side frame and second side frame are spaced apart a sufficient distance for a beam to be placed between the first side frame and the second side frame and held in a vertical orientation; and a foot extending in the first direction below the hanger lip;

wherein during use in the pool covering system, the bracket hangs from the hanger lip on a top surface of a pool structure and the vertical strut extends downward into an opening defined by the pool structure, and no connectors that damage the pool structure are used to attach the bracket to the pool structure.

2. The bracket for a pool covering system of claim 1, wherein the bracket is made of a rigid metal and coated in a protective material to protect the pool structure.

3. The bracket for a pool covering system of claim 1, wherein the hanger lip has a malleable layer configured to form to a coping of the pool structure.

4. The bracket for a pool covering system of claim 3, wherein the pool structure has a raised coping and the hanger lip is at an acute angle with the vertical strut, and wherein the malleable layer engages the top surface of the pool structure around the raised coping.

5. The bracket for a pool covering system of claim 1, wherein the bracket is water resistant.

6. The bracket for a pool covering system of claim 1, wherein at least one of said first side frame and said second side frame comprises a rod and an opening is defined by the rod, the vertical strut and the horizontal support.

7. The bracket for a pool covering system of claim 1, wherein at least one of said first side frame and said second side frame comprises a plurality of holes.

8. The bracket for a pool covering system of claim 1, wherein the hanger lip and the horizontal support are aligned between the first side frame and second side frame.

* * * * *